US007606632B2

United States Patent
Roberts

(10) Patent No.: US 7,606,632 B2
(45) Date of Patent: Oct. 20, 2009

(54) APPARATUS FOR DISPENSING ACTIVATED MONITORING DEVICES

(75) Inventor: William Peyton Roberts, Spartanburg, SC (US)

(73) Assignee: Cryovac, Inc., Duncan, SC (US)

( * ) Notice: Subject to any disclaimer, the term of this patent is extended or adjusted under 35 U.S.C. 154(b) by 762 days.

(21) Appl. No.: 10/869,815

(22) Filed: Jun. 16, 2004

(65) Prior Publication Data

US 2005/0283272 A1    Dec. 22, 2005

(51) Int. Cl.
*G07F 17/00*    (2006.01)
(52) U.S. Cl. ..................... 700/242; 700/235
(58) Field of Classification Search ............... 700/242, 700/235
See application file for complete search history.

(56) References Cited

U.S. PATENT DOCUMENTS

| | | | | |
|---|---|---|---|---|
| 3,668,980 | A | * | 6/1972 | Tone ..................... 493/326 |
| 3,923,036 | A | * | 12/1975 | Jennings et al. .............. 124/88 |
| 4,035,614 | A | * | 7/1977 | Frattarola et al. ........... 235/431 |
| 4,204,635 | A | * | 5/1980 | Hofmann et al. ............ 235/382 |
| 4,650,977 | A | * | 3/1987 | Couch ..................... 235/379 |
| 4,737,758 | A | * | 4/1988 | Meiksin et al. ........... 340/932.2 |
| 4,868,736 | A | * | 9/1989 | Walker ..................... 711/164 |
| 5,181,786 | A | * | 1/1993 | Hujink ..................... 400/61 |
| 5,673,309 | A | * | 9/1997 | Woynoski et al. ...... 379/114.18 |
| 5,696,908 | A | * | 12/1997 | Muehlberger et al. ......... 705/39 |
| 5,721,781 | A | * | 2/1998 | Deo et al. ..................... 705/67 |
| 5,730,816 | A | | 3/1998 | Murphy |
| 5,743,429 | A | | 4/1998 | Morofsky |
| 5,754,654 | A | * | 5/1998 | Hiroya et al. ................ 705/76 |
| 5,949,046 | A | * | 9/1999 | Kenneth et al. ............ 235/380 |
| 5,994,046 | A | * | 11/1999 | Kawai ..................... 430/546 |
| 6,085,976 | A | * | 7/2000 | Sehr ..................... 235/384 |
| 6,102,248 | A | * | 8/2000 | Yamamiya .................. 221/211 |
| 6,104,291 | A | | 8/2000 | Beauvillier et al. |

(Continued)

FOREIGN PATENT DOCUMENTS

EP    00013294 A2 *    4/1989

OTHER PUBLICATIONS

Hohberger, Alchemy: A new method for on-demand embedding of RFID devices into smart labels; Smart Active Labels Technology Conference, Nov. 17, 2003.

(Continued)

*Primary Examiner*—Patrick Mackey
*Assistant Examiner*—Michael E. Butler
(74) *Attorney, Agent, or Firm*—Alston & Bird LLP

(57) ABSTRACT

The invention is a method and apparatus for dispensing an activated electronic monitoring device (EM device), such as a data logger. The invention can activate an EM device and verify activation before dispensing the EM device. The invention comprises a receptacle for storing a plurality of unactivated EM devices, a separator for separating an indivdual EM device, a reader for activating and verifying activation of the EM device, and a sorter for dispensing activated EM devices into an accept container that is readily accessible. EM devices that fail to activate can be dispensed into a reject container. In some embodiments, the apparatus includes a controller that typically comprises a microprocessor having stored instructions. The controller can typically communicate with the EM device via the reader to activate the EM device and verify activation. The controller may also be used to program or write instructions to the EM device.

18 Claims, 9 Drawing Sheets

U.S. PATENT DOCUMENTS

| | | | |
|---|---|---|---|
| 6,109,524 A * | 8/2000 | Kanoh et al. | 235/381 |
| 6,129,275 A | 10/2000 | Urquhart et al. | |
| 6,129,349 A * | 10/2000 | Olbrich et al. | 271/186 |
| 6,129,375 A * | 10/2000 | Adomeit | 280/730.1 |
| 6,173,209 B1 * | 1/2001 | Laval et al. | 700/91 |
| 6,176,425 B1 * | 1/2001 | Harrison et al. | 235/385 |
| 6,446,208 B1 * | 9/2002 | Gujar et al. | 713/185 |
| 6,494,365 B1 * | 12/2002 | Kozakai et al. | 235/380 |
| 6,519,282 B1 * | 2/2003 | Huber et al. | 375/232 |
| 6,677,852 B1 * | 1/2004 | Landt | 340/10.1 |
| 7,128,261 B1 * | 10/2006 | Henderson et al. | 235/383 |
| 2001/0011659 A1 | 8/2001 | Izawa et al. | |
| 2002/0074345 A1 | 6/2002 | Schneider et al. | |
| 2003/0122170 A1 * | 7/2003 | Apodaca et al. | 257/295 |
| 2003/0132298 A1 | 7/2003 | Swartz et al. | |
| 2003/0155370 A1 | 8/2003 | Martin et al. | |
| 2004/0006487 A1 * | 1/2004 | Tari | 705/1 |
| 2004/0142603 A1 * | 7/2004 | Walker | 439/701 |
| 2005/0251440 A1 * | 11/2005 | Bednarek | 705/10 |
| 2006/0189296 A1 * | 8/2006 | Sevilla | 455/405 |

OTHER PUBLICATIONS

Office Action for Canadian Application No. 2,508,179 dated Oct. 14, 2008.

* cited by examiner

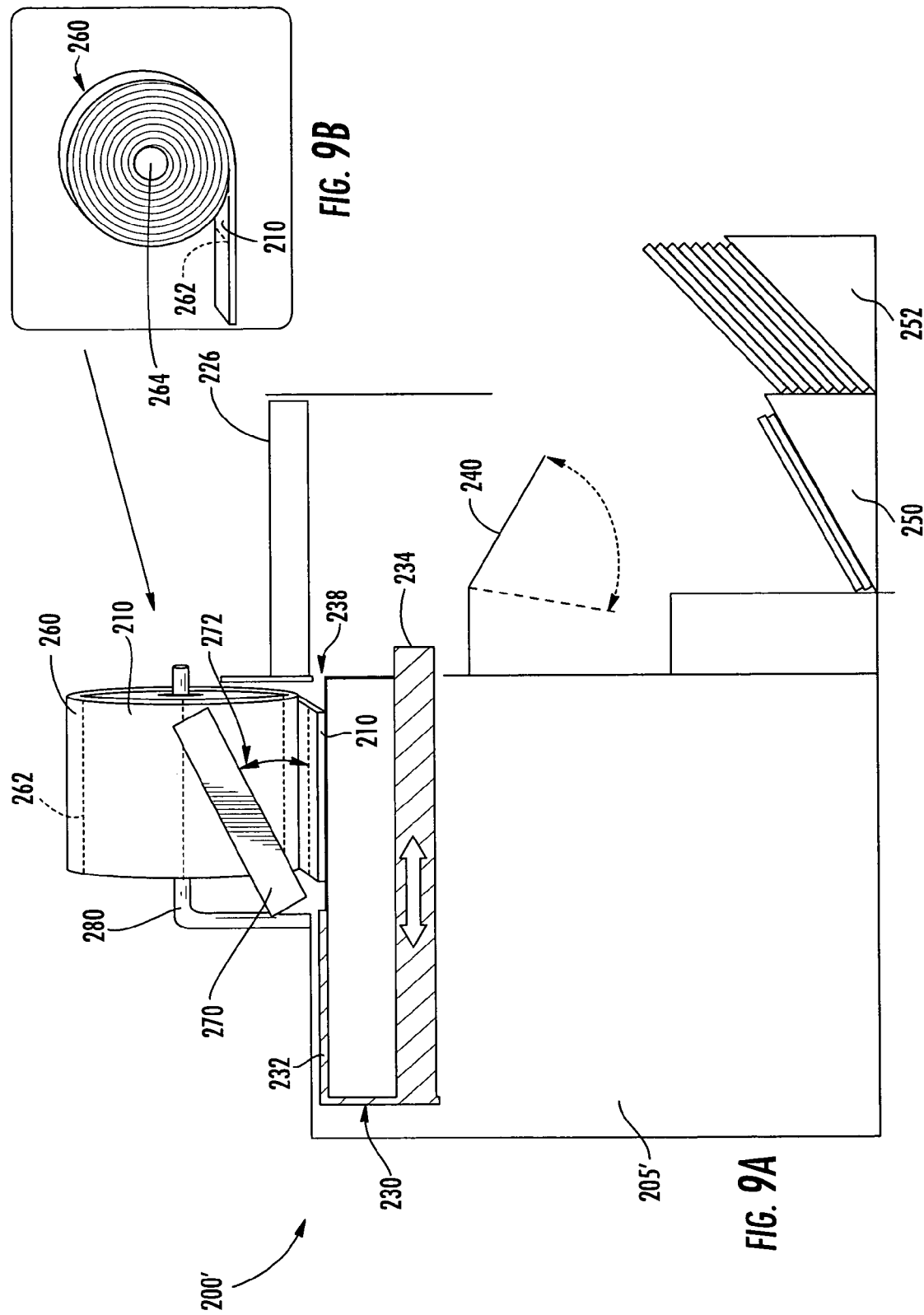

APPARATUS FOR DISPENSING ACTIVATED MONITORING DEVICES

BACKGROUND OF THE INVENTION

The invention relates generally to electronic monitoring devices, and more particularly to an apparatus for activating and dispensing an electronic monitoring device.

Electronic monitoring devices are used in a wide range of applications to record and monitor various conditions and events. Monitoring conditions, such as temperature, is important in many industries involving products that are sensitive to specific conditions. In particular, electronic monitoring devices have found increasing use in the food industry to record and monitor conditions under which items such as perishable goods have been shipped and/or stored.

Data loggers are portable electronic monitoring devices that can record measurements such as temperature, relative humidity, light intensity, on/off, open/closed, voltage, pressure, and events over time. Typically, data loggers are small, battery-powered devices that are equipped with a microprocessor, data storage and sensor. Data loggers may be programmed to take specific measurements at desired time intervals.

Data loggers are typically activated or programmed by connecting them to a computer that can be used to send and retrieve data to and from the data logger. Data loggers can also be activated by manual operation, such as a switch or push button. After the data logger has been activated it is usually positioned or deployed in a desired location for data gathering. The logger records each measurement and stores it in memory. The loggers can typically also record the date and time at which the measurement was taken. At a desired time, the data contained within the data logger is retrieved by reconnecting the data logger to a computer or similar device.

Data loggers may also employ radio frequency identification (RFID) communication protocols to activate, program, and send or retrieve data to and from the data logger. The use of RFID technology in electronic monitoring devices allows the devices to be quickly activated for immediate use. For instance, an RFID reader in communication with a computer can be used to activate and program data loggers at a point of shipping or packaging. Alternatively, data loggers can be programmed in batch and stored adjacent to a shipping station for subsequent manual activation. The data loggers can then be manually activated at a later time for immediate deployment.

In some instances data loggers may be defective, fail to properly activate, or be improperly activated (e.g., incorrect temperature limit settings or time interval for data logging). The failure of a data logger to properly activate may not be readily apparent, and in some circumstances, may not be discovered until after the data logger has already been deployed. As a result, the unactivated, improperly activated, or defective data logger will fail to measure and record the desired readings in the desired manner.

BRIEF SUMMARY OF THE INVENTION

The invention is a method and apparatus that activates electronic monitoring devices, and then dispenses the electronic monitoring device only after receiving verification that the electronic monitoring device has been activated. As a result, the use of unactivated or improperly activated electronic monitoring devices can be reduced. The apparatus can rapidly and efficiently activate multiple electronic monitoring devices in sequence. Additionally, the apparatus is capable of verifying that each individual electronic monitoring device has been activated. Electronic monitoring devices that are successfully activated can be dispensed for subsequent use. In some embodiments, electronic monitoring devices that fail to activate can be dispensed into a reject container that may or may not be readily accessible. The method and apparatus can be used to quickly activate and dispense activated electronic monitoring devices. As a result, the deployment and use of unactivated, improperly activated, or defective electronic monitoring devices may be reduced or prevented.

The invention comprises a separator that can remove an individual unactivated electronic monitoring device (EM device) from a receptacle that is adapted for storing multiple EM devices. The separator cooperates with a reader for positioning the EM device in communication with a reader. The reader may be used to send an activation signal, optionally including activation instructions such as temperature limit values or time interval for data logging, and an activation verification query to the EM device. After a successful activation, the EM device can communicate with the reader to indicate that it has been successfully activated. Activated EM devices can then be dispensed into a container for subsequent retrieval and use. The apparatus typically includes a sorter that dispenses activated EM devices into an accept container, and EM devices that fail to activate into a reject container.

The apparatus may also include a controller or microprocessor that integrates and controls operation of the apparatus. Typically, the controller may be operatively connected and in communication with the separator, sorter, and reader. In some embodiments, the controller may also include stored instructions that are communicated to an EM device via the reader. The instructions can include, for example, activation commands, verification queries, information about products being monitored, acceptable temperature limits, time intervals for data logging, and the like. The controller may also be used to receive data from an EM device that can be stored or processed by the controller.

The invention may also be used for activating electronic monitoring devices that comprise a radio frequency identification (RFID) communication interface. In embodiments comprising RFID or other wireless communication protocols, the reader and EM device can be in wireless communication. Data loggers are electronic monitoring devices that are particularly useful in the practice of the invention. Data loggers can be used to monitor a wide variety of environmental conditions, such as temperature, humidity, and shock/vibration.

Thus, among other things, the invention provides a method and apparatus that may be used to activate, confirm activation, and dispense activated EM devices into an accept container. As a result, the use of unactivated, improperly activated, or defective electronic monitoring devices can be reduced or prevented.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
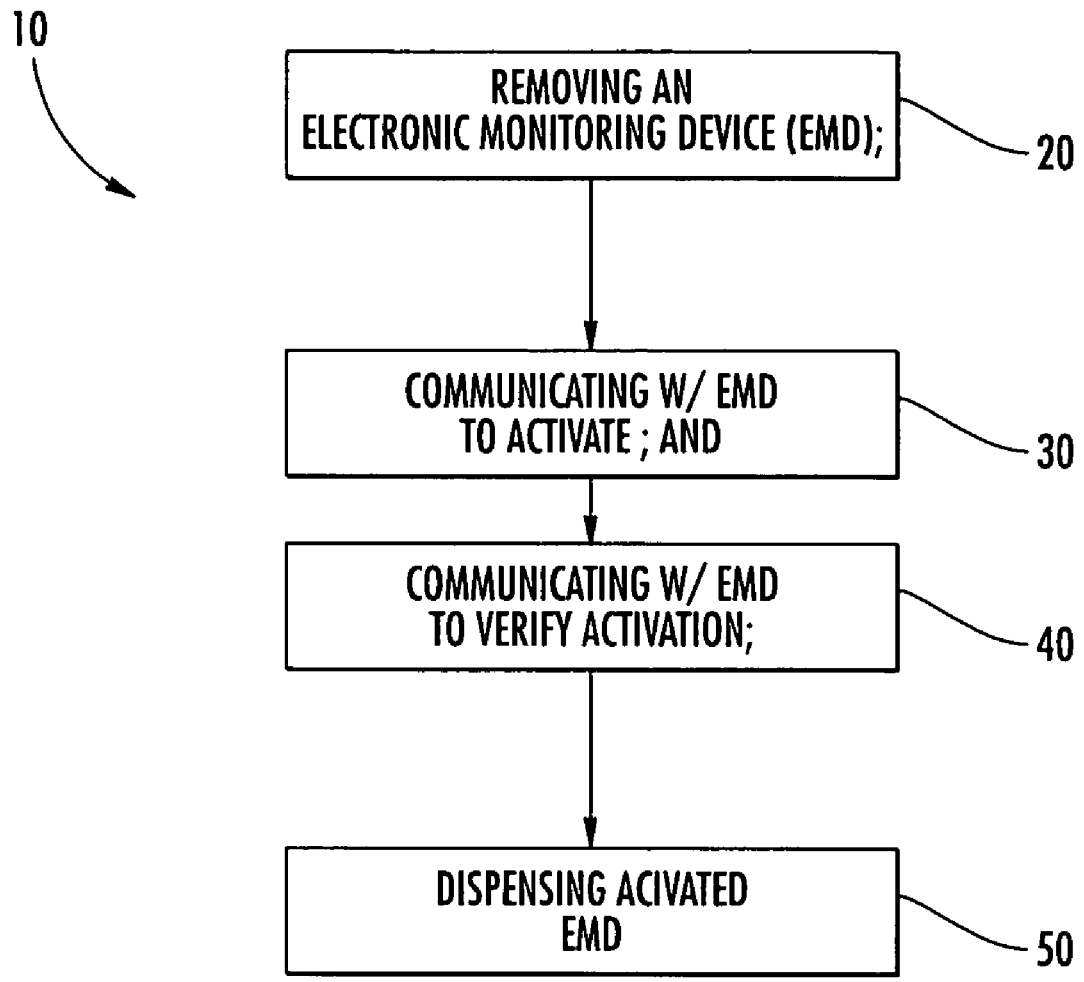
FIG. 1 is a block diagram illustrating a method in accordance with the invention.

FIGS. 3 through 8 are graphical illustrations of an exemplary dispenser that is adapted for activating and dispensing an electronic monitoring device, each Figure representing a different stage of the activation and dispensing process; and FIGS. 9A and 9B are graphical illustrations of an alternative embodiment of a dispenser that is adapted for activating and dispensing an electronic monitoring device in roll form.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The invention is a method and apparatus that are useful for activating and dispensing an electronic monitoring device. The apparatus and method can be used to separate an individual electronic monitoring device from a plurality of such devices, activate the electronic monitoring device, verify that the electronic monitoring device is active, and dispense the activated monitoring device into a container where it can be retrieved for subsequent use. The apparatus and method separate activated electronic monitoring devices from devices that fail to activate. As a result, the use of defective or non-activated electronic monitoring devices can be reduced or substantially prevented.

Electronic monitoring devices that are useful in the invention may include small portable electronic devices, such as data loggers, that can be programmed to collect and record specific measurements. The electronic monitoring devices (EM devices) are typically battery powered and comprise a microprocessor, instruments for taking measurements, and recordable medium for storing data. Typical measurements include, for example, temperature, relative humidity, light intensity, on/off, open/closed, voltage, pressure, and events over time. In some embodiments, the EM devices can be about the size and shape of a conventional "credit card." EM devices in the shape of a "card" may be conveniently stacked and stored for subsequent use. Additionally, "card" shaped EM devices can be deployed in a wide variety of applications where a compact size is desirable.

In some embodiments, the EM device may also include input/output (I/O) terminals for communication with a reader. The EM device may also include a radio frequency (RF) transceiver that can be used to wirelessly activate the EM device, and to send and receive data between the EM device and a reader. Electronic monitoring devices having a RF transceiver also include an antenna for wirelessly communicating with the reader. EM devices that are useful in the invention can monitor and record a wide variety of conditions including, but not limited to, temperature, humidity, pressure, on/off cycles, and the like. The EM device may also include a radio frequency identification (RFID) communication interface that can activate and communicate with the EM device. Card size data loggers employing an RFID communication interface are useful in the practice of the invention.

With reference to FIG. 1, an exemplary method of dispensing an activated EM device is illustrated and broadly designated with reference number 10. The method 10 provides a quick and efficient method for activating and processing multiple EM devices. The method may also be used to rapidly program or write information to an EM device.

As shown in FIG. 1, an individual EM device is removed from a plurality of unactivated EM devices at step 20. The plurality of EM devices in some embodiments comprises a stack of multiple EM devices or a roll of continuous EM devices that are typically stored in a receptacle.

The individual unactivated EM devices may be sequentially positioned in communication with a reader at step 30 so that each EM device can be individually activated. At step 30, the reader communicates with each individual EM device to activate the EM device. In step 40, the reader or a separate device communicates with the EM device to verify activation. In some embodiments, a single reader is adapted to communicate both the activation signal and verification request. In other embodiments, the activation and verification requests may be performed at two separate stations. In this embodiment, the separate activation station and verification station could be in close proximity to each other so that the separator does not have to reposition the EM device to perform both activation and verification. Alternatively, the separator could first position the EM device in communication with a reader for activation, and then reposition the EM device into communication with a reader adapted for verifying activation.

Typically, the activation signal, and any necessary instructions, are communicated to the EM device before the verification request, but it should be recognized that the activation signal and verification request could be communicated simultaneously. The verification request is typically a program module that requests that the EM device communicates a verification signal indicating that it has been activated. Additionally, the reader may be used to program or write information to the EM device. The information can include, but is not limited to, identification information, time-date setting, programming for performing monitoring, and the like. In some embodiments, the EM device may include a unique identification code that can be communicated to the reader for storage and future reference.

Upon completion of activation and verification, the EM device is typically moved to a sorter where activated EM devices can be dispensed at step 50. The sorter can dispense the EM device into an operator accessible container if the reader receives a verification signal from the EM device. In some embodiments, EM devices that fail to activate can be dispensed into a separate container that may or may not be accessible.

Figure 2:
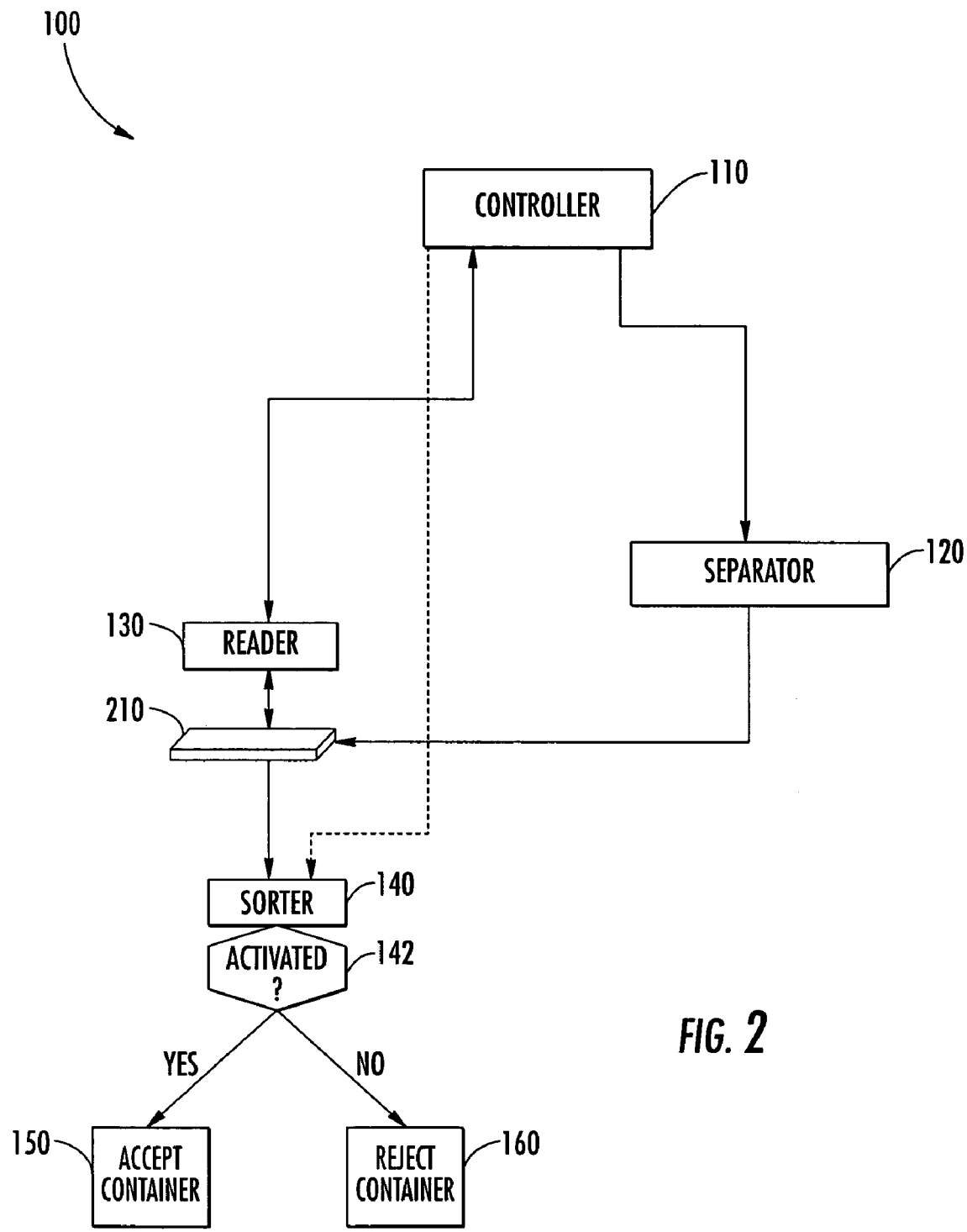
FIG. 2 is a schematic diagram illustrating an apparatus for activating and dispensing an electronic monitoring device that is in accordance with the invention.

With reference to FIG. 2, an apparatus for dispensing activated electronic monitoring devices is broadly designated as reference number 100. As shown in FIG. 2, the system 100 comprises a separator 120 adapted for removing an electronic monitoring device from a receptacle having a plurality of EM devices, a reader 130 adapted for communicating with an EM device, and a sorter 140 adapted for dispensing an activated EM device.

The separator 120 removes an individual EM device 210 from a receptacle that is capable of storing a plurality of unactivated electronic monitoring devices. The separator 130 cooperates with the reader 130 to position an unactivated EM device 210 into communication with the reader. The receptacle can typically receive and store multiple unactivated EM devices in a wide variety of storage arrangements. For example, the EM devices can be stored in a vertical or horizontal stack. The EM devices may also be disposed on a continuous roll of EM devices.

In some embodiments, the reader 130 comprises an activator device and a verifier device that are configured to activate an EM device 210 and to verify that the EM device has been activated. The activator device and the verifier device may comprise a single integrated reader. In alternate embodiments, the activator and verifier can comprise two separate devices. In embodiments where the EM device includes a RFID tag, the reader will typically include a radio frequency (RF) transceiver (transmitter and receiver) for wireless communication with an EM device. In alternate embodiments, the reader may include I/O terminals for wired communication with the EM device.

If verification is received that the EM device has been activated (see reference number 142), the sorter 140 can dispense the activated EM device into an accept container 150 for subsequent use. In alternative embodiments, the system may also include a container 160 that is adapted for receiving unactivated or defective EM devices. In the event the reader fails to receive activation verification, the sorter 140 can dispense the uncativated EMD into a reject container 160. The reject container can be fully accessible or, alternatively, it can be in a screened position to prevent an unactivated EM device from being inadvertently deployed.

In some embodiments, the apparatus includes a controller, processor, computer, or the like 110. The controller 110 may control and integrate the operation of the apparatus 100. As shown in FIG. 2, the controller 110 may be operatively connected and in communication with the separator 120, reader 130, and sorter 140. The controller 110 typically comprises a microprocessor for controlling and sending instructions to the separator, reader, and sorter. The controller can be internal or external to the apparatus.

As described above, the controller can be used to communicate programming and other information to the EM device. The controller 110 typically comprises a stored set of instructions that may be communicated to the apparatus and the EM device. The instructions can include activation modules for communicating an activation signal to the EM device via the reader, and verification modules for communicating a verification query to the EM device via the reader and for receiving a verification signal from the EM device via the reader. Additionally, the controller 110 may also be in communication with a computer or data base for sending and receiving data to and from the controller. In this embodiment, the controller can be updated to comprise new activation and verification modules, and new programming and instructions.

In alternate embodiments, the controller 110 may be an external computer that is operatively connected and in communication with the apparatus 100. The computer, similar to the controller described above, may control the apparatus and send and receive data to and from the reader. The external computer can be in wired or wireless communication with the apparatus.

Figure 3:
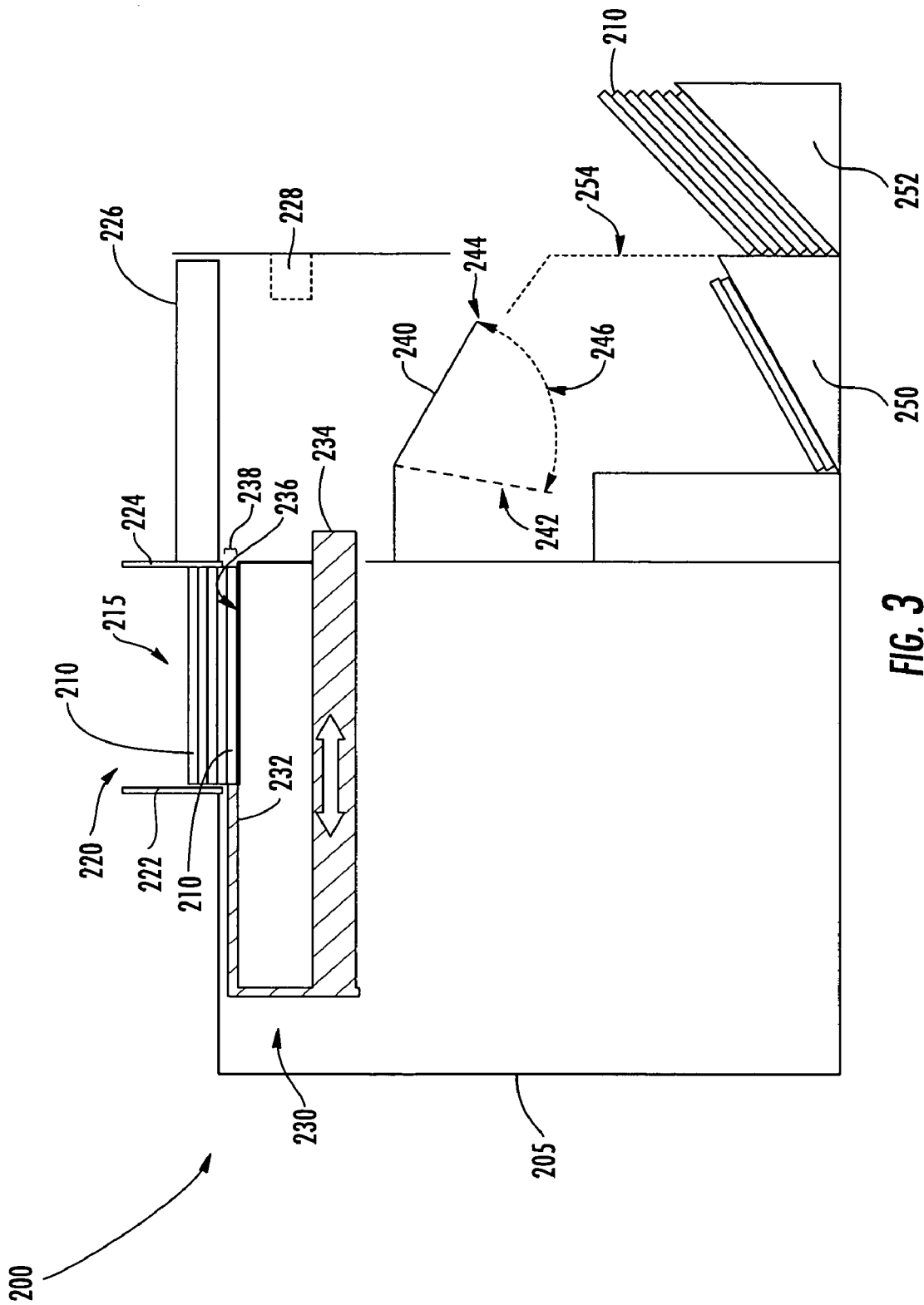
Figure 4:
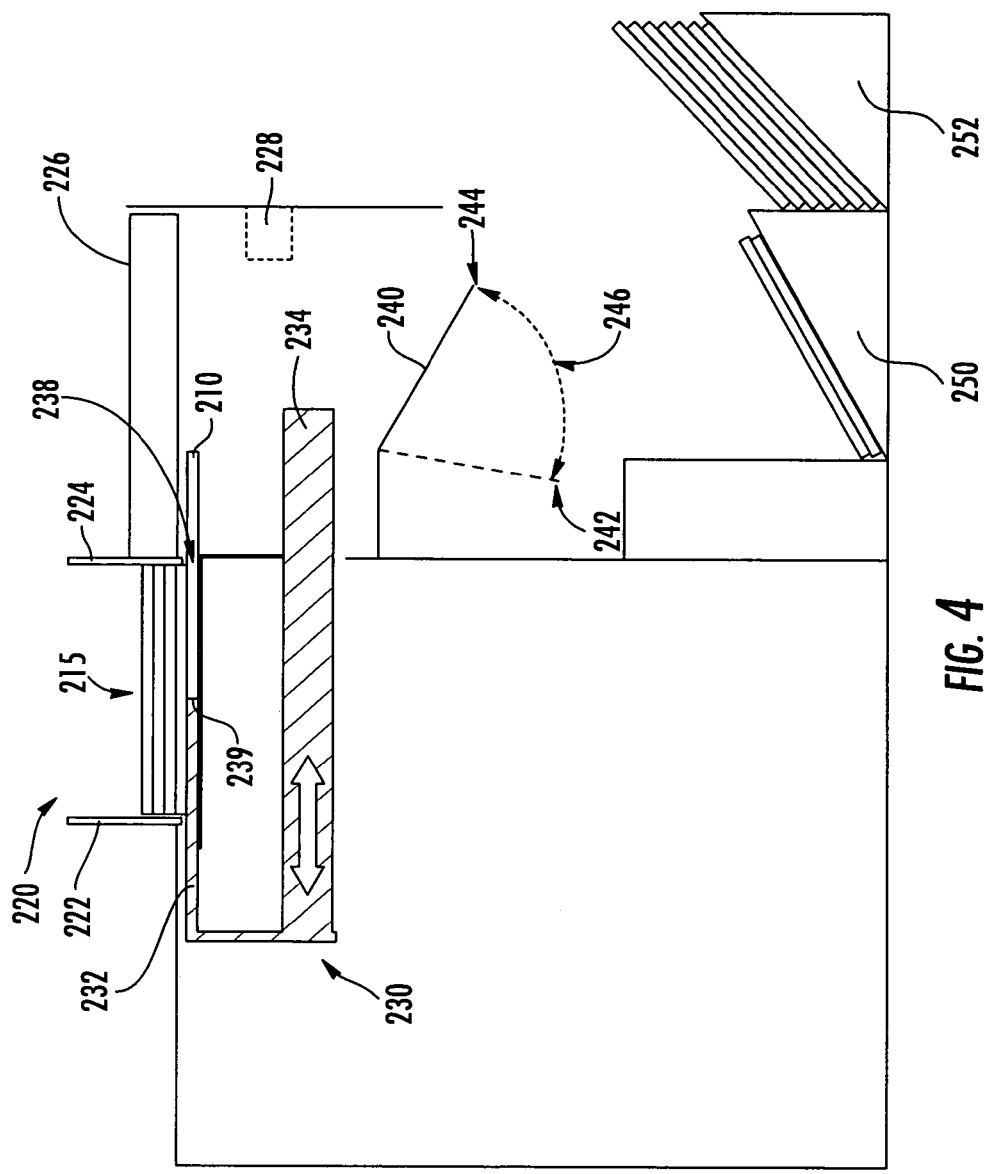
Figure 5:
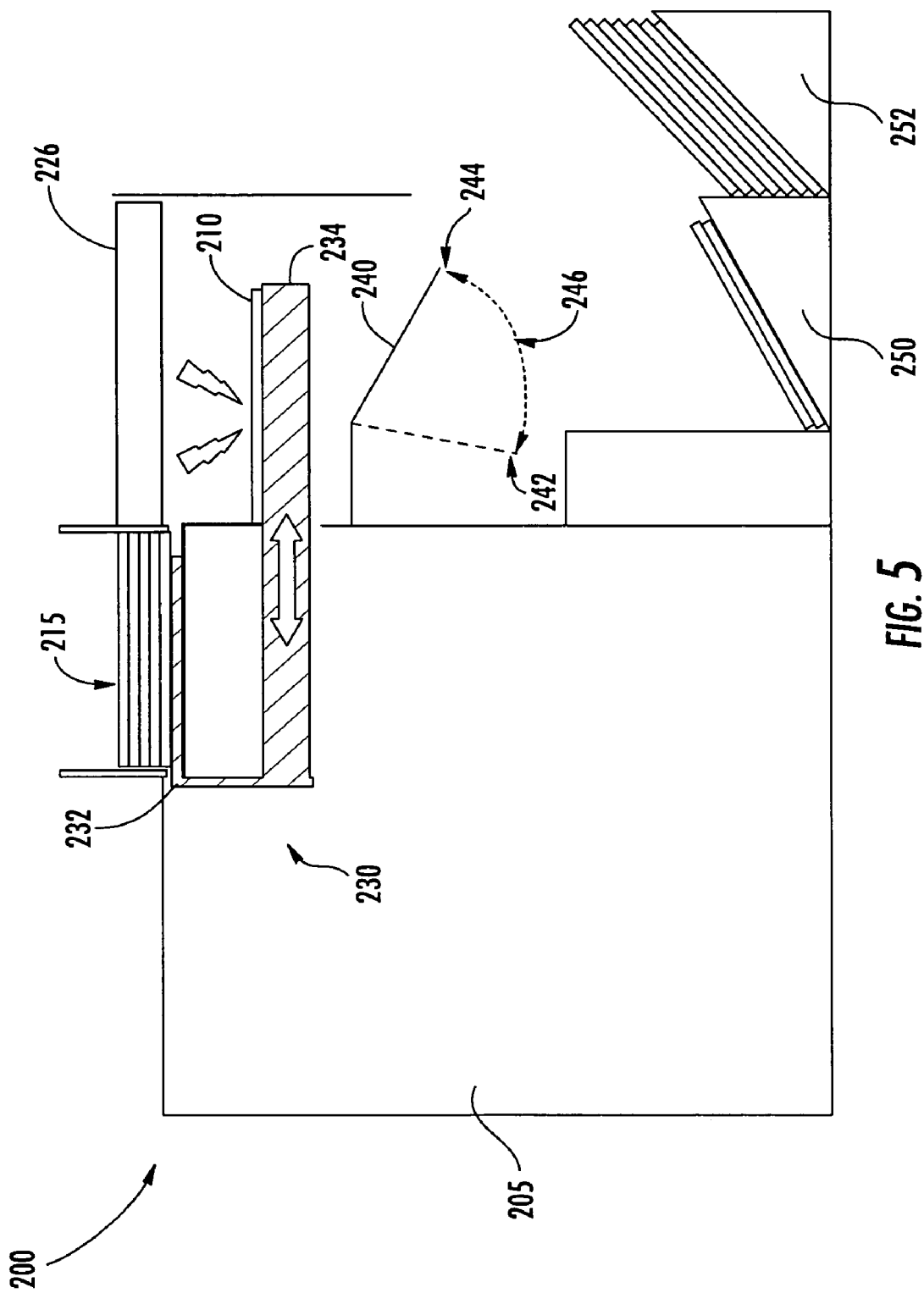
Figure 6:
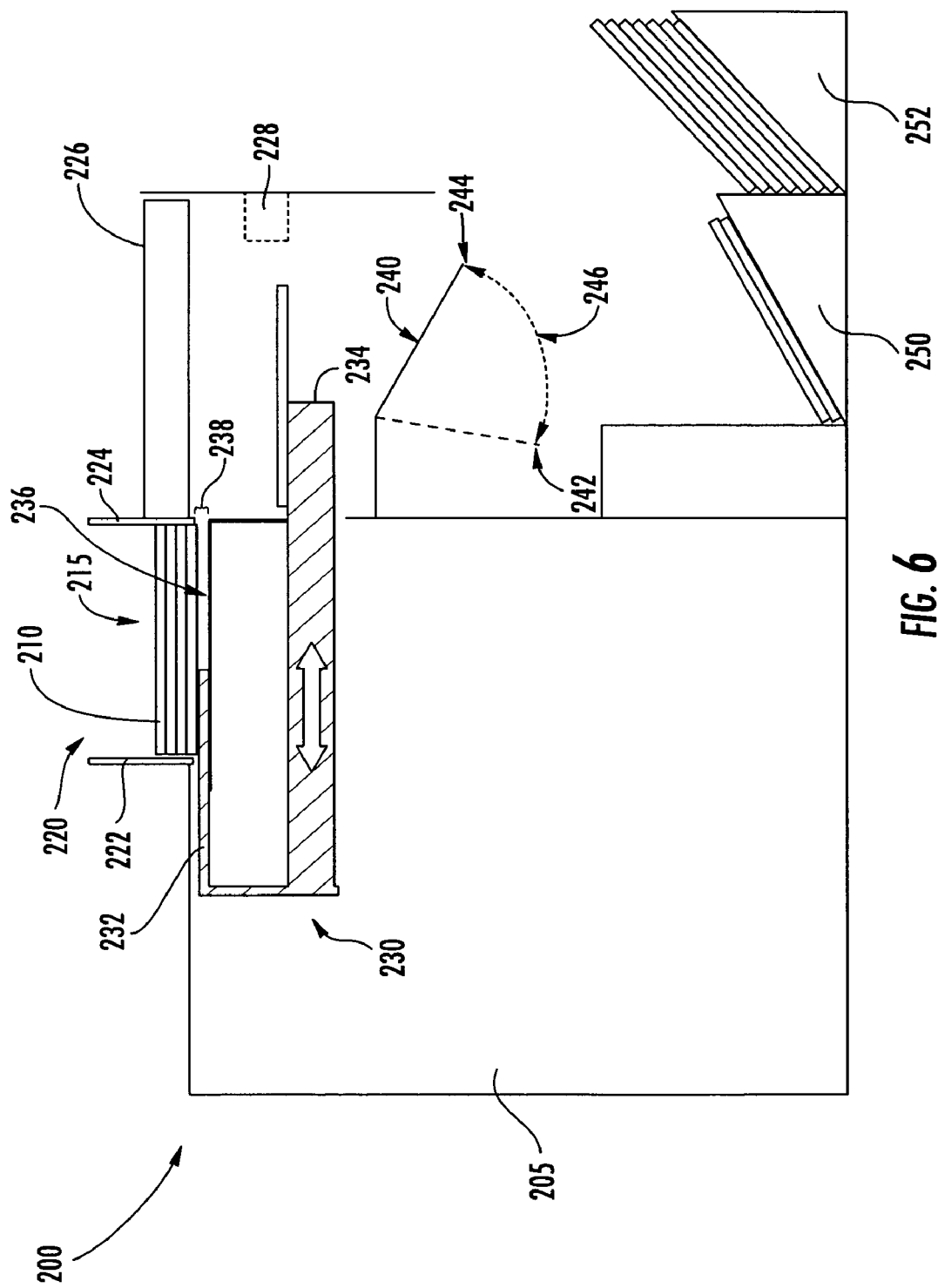
Figure 7:
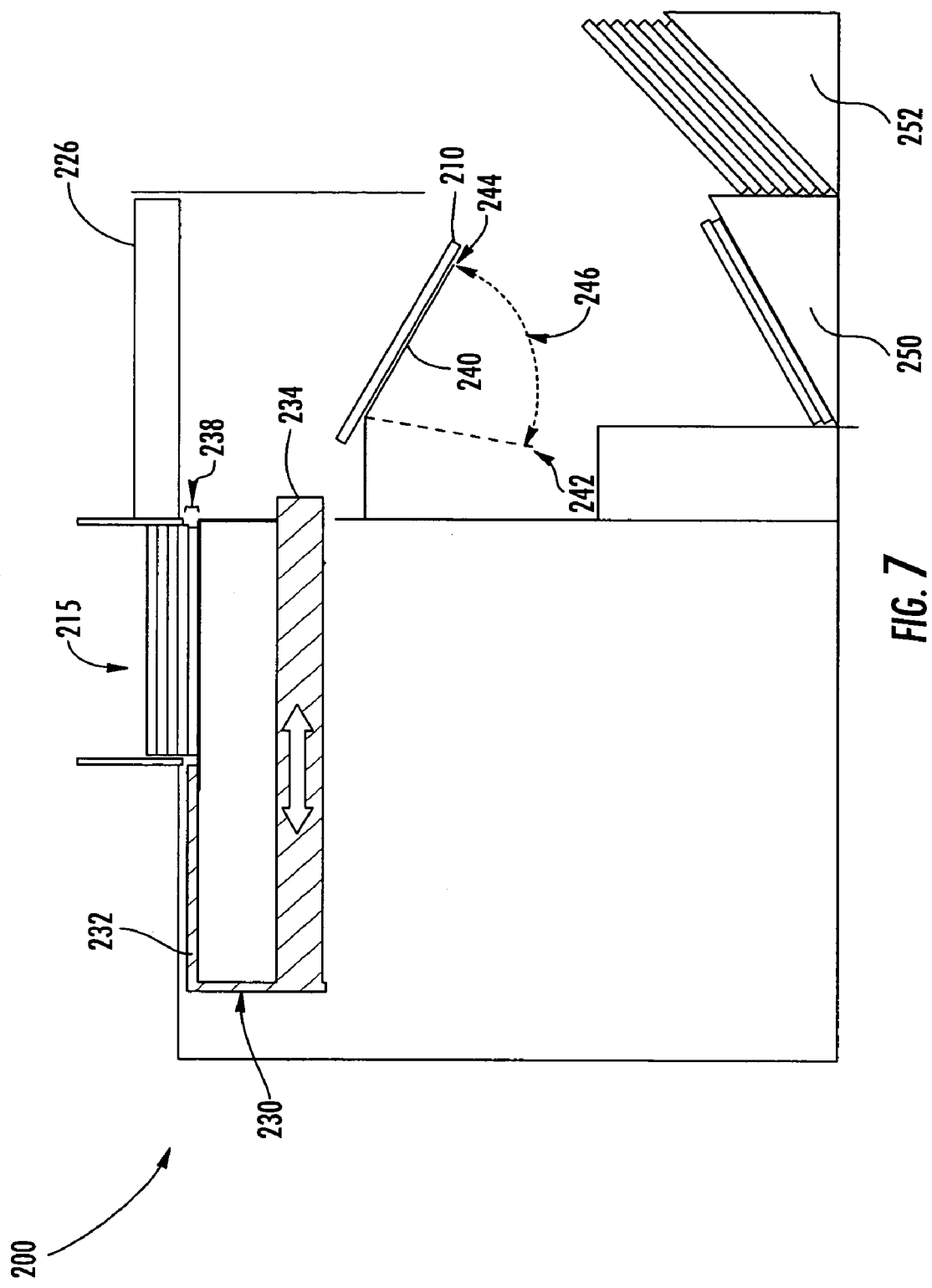
Figure 8:
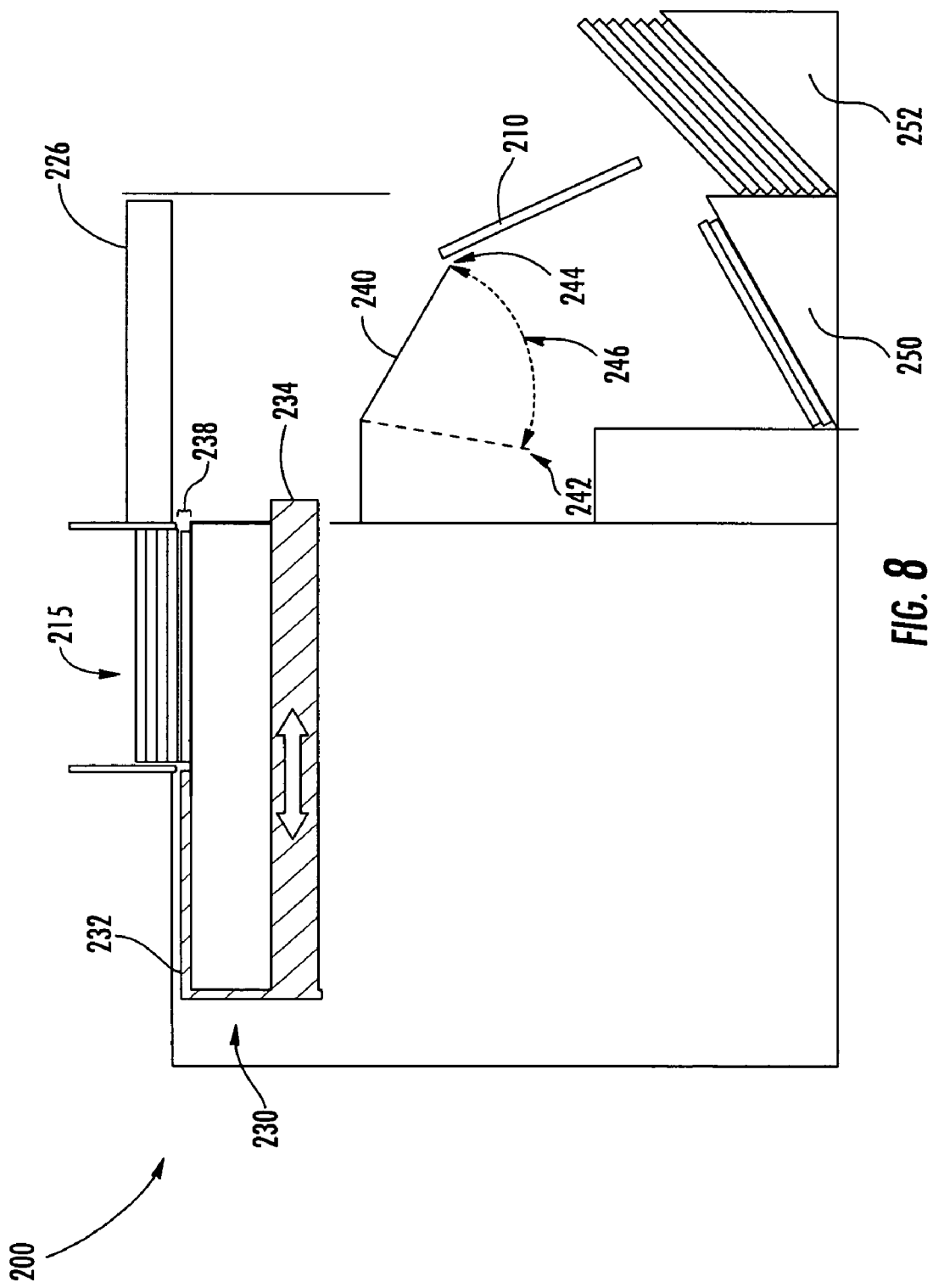

With reference to FIGS. 3 through 8 an exemplary embodiment of a dispensing apparatus is broadly designated as reference number 200. FIGS. 3 through 8 illustrate the function of the apparatus 200 in a step-wise manner. FIGS. 3 and 4 illustrate a separator 230 removing an individual EM device 210 from a receptacle 220 for storing a plurality of unactivated EM devices 215 and moving the EM device in a position for communication with a reader 226 that is adapted for communicating with the EM device. FIG. 5 illustrates the EM device in communication with the reader 226. FIGS. 6 through 8 illustrate the apparatus 200 sorting and dispensing an activated EM device into an accept container 252.

As shown in FIG. 3, the apparatus 200 comprises a housing 205, a receptacle 220 adapted for storing a plurality of electronic monitoring devices 215; a separator 230 for removing an individual EM device 210 from the receptacle 220; a reader 226 or 228 for communicating with the EM device 210; a sorter 240 for dispensing an activated EMD into an accept bin 252 and an unactivated EM device into a reject container 250.

The receptacle 220 can be in the form of a hopper having side walls adapted for stackably receiving a plurality of EM devices. With reference to FIGS. 3 through 8, it is to be noted that the receptacle 220 in some embodiments can be designed to hold a plurality of EM devices 215 stacked one upon another. The receptacle 220 comprises a housing formed of a horizontal base surface 236 and two vertically extending side walls 222, 224. The receptacle 220 comprises an open top and bottom parallelepiped chute-like having width and depth dimensions conforming to the EM devices 210 and a height to hold a large supply of such EM devices in a horizontal manner. As shown in FIGS. 3 through 8, side walls 222 and 224 are not in contact with surface 236 and thereby define a passageway through which the bottommost EM device can be slidably separated from the stack of EM devices 215.

Preferably the receptacle 220 is constructed of a clear plastic to assist the operator of the dispenser 200 in visually inspecting the number of EM devices 210 contained in the stacker.

Although a clear plastic is preferred, the receptacle 220 may be made of metal, and whether made of metal or plastic may have suitable holes or slots to provide both physical and visual access to the cards therein. Although not illustrated, it should be recognized that the receptacle 220 can include four side walls for stackably receiving a plurality of EM devices.

The separator 230 typically comprises a moveable carriage assembly having a pusher 232 and a reading platform 234. The pusher 232 is adapted for removing an individual EM device from the receptacle 220. The reading platform is adapted for cooperating with the reader 226 to position the EM device in communication with the reader. The carriage assembly 230 can move from a retracted position to an extended position. In the retracted position, the carriage assembly 230 is retracted into the housing 205. In this regard, FIG. 3 illustrates the carriage assembly 230 in a retracted position. In the extended position, the platform 234 is extended outwardly from the housing 205 (see FIG. 6). The carriage assembly 230 may comprise a drive system adapted for driving the carriage assembly between a retracted position and an extended position. Typically the carriage assembly 230 is moved with an electric motor (not illustrated). During operation, the pusher 232 engagingly contacts the bottommost EM device 210 at 239. As the carriage assembly 230 moves from a retracted position to an extended position, the bottommost card is slidably separated from the stack 215 and travels through passageway 238. In this regard, FIG. 4 shows an EM device 210 that is in the process of traveling through the passageway 238.

Continued movement of carriage assembly 230 into an extended position will cause EM device 210 to move from a first position on surface 236 and to be repositioned in a second position on reading platform 234 that may be in communication with the reader 226. FIG. 5 illustrates an EM device 210 disposed on platform 234. While positioned on the reading platform 234, the EM device can be in communication with reader 226. As discussed above, the reader 226 typically communicates with the EM device 210 to activate the EM device and verify activation. The embodiment in FIG. 5 depicts a RFID reader that is wirelessly communicating with an EM device. In an alternate embodiment, the EM device may comprise I/O terminals for wired communications with the reader. In this regard, FIG. 3 depicts a reader 228 (represented by the dashed line) having I/O terminals for communicating with an EM device. In this embodiment, the carriage assembly would move into an extended position wherein the reader 228 and EM device may be in a wired communication relationship.

While in communication, the reader may communicate to activate the EM device. In a subsequent or simultaneous step, the reader may send a verification command or query to the EM device to confirm that the EM device has been activated. Additionally, as described above, the reader in some embodiments may also program or write instructions to the EM device. Once the activation and verification steps have been completed, the carriage assembly may return to a retracted position.

The dispenser may also include a sorter 240 adapted for dispensing activated EM devices. In one embodiment, the sorter comprises a deflector or similar mechanism that dispenses an activated EM device into an appropriate container. In this regard, FIGS. 3 through 8 illustrate a sorter that can move between two positions for sorting activated and unactivated EM devices. When dispensing an activated EM device, the deflector moves from a retracted position 242 to an outwardly extended position 244. Movement of deflector is represented by arrow 246. In this regard, FIGS. 6 through 8 illustrate a deflector 240 that is outwardly extended while in the activated dispensing position. In the unactivated dispensing position 242, the deflector may be retracted. If the reader receives verification that the EM device has been activated, a signal or communication may be sent to the sorter directing it to move into an extended position 244. The reading platform 234 can be retracted into the housing 205 subsequent to or concurrent to the movement of the deflector into position 244. In this regard, FIGS. 6 through 8 illustrate an activated EM device being dispensed into an activated container 252. Retraction of reading platform 234 causes EM device to travel downwardly in the direction of deflector 240. As shown in FIGS. 7 and 8, the activated EM device travels across the surface of the deflector and is dispensed into an accept container 252 that is adapted for receiving activated EM devices. The deflector 240 can remain in a retracted position 242 if the reader does not receive verification that the EM device has been activated. As a result, retraction of the reading platform 234 will cause an unactivated EM device to fall downwardly into a reject container 250 that is adapted for receiving unactivated or defective EM devices. It should be recognized that a variety of mechanisms can be used to sort and dispense activated and unactivated EM devices, and that the invention is not limited to the embodiment described above.

In some embodiments, the reject container 250 is not readily or normally accessible to an operator. In this regard, FIG. 3 illustrates an apparatus 200 having an enclosure or screen 254 that prevents easy access to unactivated EM devices. The enclosure is represented by the dashed lines at 254. The enclosure may help reduce the possibility of deploying an unactivated EM device.

In an alternative embodiment, the EM devices can be supplied in the form of a continuous roll. In this regard FIGS. 9A and 9B illustrate an alternative embodiment of an apparatus for dispensing and activating EM devices that is broadly designated with reference number 200'. In this embodiment, EM devices 210 may be disposed on a continuous roll 260. The roll 260 typically has multiple EM devices that may be separated by a perforation 262.

The apparatus 200' can include a mounting bracket or support 280 that is fixed or secured to the housing 205'. The roll may have a core 264 through which support 280 may be insertably disposed. The apparatus 200' may also comprise a dividing mechanism 270 that cooperates with the carriage assembly 230 for separating each successive EM device from the roll. The apparatus 200' may also include a drive system for sequentially positioning an individual EM device in a cutting relationship with the cutting mechanism 270. A motor (not illustrated) can sequentially drive each EM device forward onto the carriage assembly 230 to a predetermined location where the dividing mechanism 270 can separate the EM device. Arrow 272 illustrates a possible cutting action that is performed by the dividing mechanism 270. After separation, the carriage assembly cooperates with the reader 226 to move the separated EM device into a communicative position. Apparatus 200' may also include a controller that controls and integrates the operation of the dispenser.

In an alternate embodiment, the apparatus may also be operatively connected and in communication with a data entry device, such as a scanner. The data entry device can scan or read product codes disposed on products or items that are to be monitored. Typically, the data entry device is a bar code scanner or RFID scanner. Other devices that could be used include, without limitation, keyboards, magnetic readers, scales, etc. The data entry device may be in wired or wireless communication with the apparatus.

In one embodiment, the scanning process can function to initiate activation and dispensing of activated EM devices. In another embodiment, the data entry device can also communicate the product code to a controller, external computer system or database (collectively "database") that may contain stored product code data or information. The database could use the product code to determine if the particular product or item scanned requires monitoring, and whether an EM device should be activated and dispensed. The database could also be used to retrieve any product information such as stored monitoring instructions that may be specific to the product scanned. Any retrieved monitoring instructions could then be communicated to the reader for writing to the EM device. Examples of product codes include, for example, Uniform Parcel Code (UPC), European article numbering (EAN-13) codes, serial shipping container codes (SSCC), global trade item numbers (GTIN) codes, electronic product codes (EPC), and the like. The product codes can be used to track inventory, retrieve monitoring instructions, shipment dates, and the like. In addition, if the item to be monitored possesses a unique identification code, such as an EPC code, the data entry device may be used to communicate the scanned code to a database where it can be stored or processed.

It should be apparent from preceding discussion that the invention provides a rapid and efficient method and apparatus for dispensing activated EM devices. As a result, the use of unactivated, improperly activated, or defective EM devices may be reduced or avoided.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for dispensing and activating electronic monitoring devices comprising:
   a) a receptacle capable of storing a supply of unactivated electronic monitoring devices, wherein the electronic monitoring devices comprise a plurality of individual cards disposed on a continuous roll;
   b) a separator cooperating with said receptacle for removing respective individual monitoring devices from the receptacle, said separator comprising a cutting mechanism and a moveable carriage assembly that cooperate to remove an individual card from the roll;

c) an activator cooperating with said separator and configured to communicate an activation signal to an individual monitoring device removed from the receptacle by the separator;
d) a verifier configured to communicate with the individual monitoring device subsequent to the activation signal to obtain a verification signal confirming that the individual monitoring device has been activated; and
e) a dispenser cooperating with said verifier and operable for dispensing the individual monitoring device after receipt of a verification signal confirming that the individual monitoring device has been activated.

2. The apparatus of claim 1, wherein said dispenser includes a first container for receiving monitoring devices that have been confirmed as activated, a second container for receiving monitoring devices that have not been confirmed as activated, and a sorter capable of directing confirmed activated monitoring devices into said first container based upon receipt of a verification signal from the verifier and directing monitoring devices not confirmed as activated into said second container.

3. The apparatus of claim 2, further including a housing containing said first and second container, the housing having an opening providing access to the activated monitoring devices deposited in the first container, and the second container being located within the housing and normally inaccessible.

4. The apparatus according to claim 1, wherein the electronic monitoring devices comprise data loggers equipped for wireless communication with a reader, and the system includes a reader configured for wirelessly communicating with an individual monitoring device upon removal from the receptacle by the separator to send and receive the activation and verification signals.

5. The apparatus according to claim 4, wherein the electronic monitoring devices include an RFID communication interface, and wherein the reader is also configured for receiving a unique identification code from the monitoring device.

6. The apparatus according to claim 4, including a computer connected to said reader and a stored set of instructions thereon, said instructions including an activation module for communicating the activation signal to the monitoring device via the reader and a verification module for communicating a verification query to the monitoring device via the reader and for receiving a verification signal from the monitoring device via the reader.

7. The apparatus according to claim 1, further comprising a controller that is operatively connected and in communication with said activator, verifier, dispenser, and separator.

8. The apparatus according to claim 7, wherein said controller includes programming and instructions thereon for sending an activation signal to an electronic monitoring device via said activator.

9. The apparatus according to claim 7, wherein said controller is adapted to write instructions to an electronic monitoring device.

10. The apparatus according to claim 9, further comprising a data entry device that is operatively connected and in communication with said apparatus.

11. The apparatus according to claim 10, wherein said data entry device is a bar code scanner or RFID scanner.

12. The apparatus according to claim 1, further comprising a controller adapted for sending an activation signal to said electronic monitoring device via said reader wherein said controller includes a stored set of instructions thereon, said instructions including an activation module for communicating the activation signal to the electronic monitoring device via the reader and a verification module for communicating a verification query to the electronic monitoring via the reader and for receiving a verification signal from the electronic monitoring via the reader.

13. The apparatus according to claim 12, further comprising a database capable of storing and retrieving product code information, said database in communication with said controller.

14. The apparatus according to claim 13, further comprising a data entry device that is in communication with said database, whereby said data entry device is capable of communicating a product code to said database.

15. The apparatus according to claim 14, wherein said product code information comprises monitoring device instructions.

16. The apparatus according to claim 12, wherein said controller is adapted for writing instructions to said electronic monitoring device via said reader.

17. The apparatus according to claim 12, wherein said plurality of electronic monitoring devices are adapted to record temperature readings.

18. The apparatus according to claim 1, wherein said moveable carriage assembly includes a pusher and a reading platform, said reading platform including a second surface that is lower than said first surface, and wherein said pusher is adapted to engage and push an electronic monitoring device separated from the roll from said first surface onto said second surface.

* * * * *

UNITED STATES PATENT AND TRADEMARK OFFICE
CERTIFICATE OF CORRECTION

PATENT NO. : 7,606,632 B2  
APPLICATION NO. : 10/869815  
DATED : October 20, 2009  
INVENTOR(S) : William Peyton Roberts Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1328 days.

Signed and Sealed this

Twelfth Day of October, 2010

David J. Kappos  
*Director of the United States Patent and Trademark Office*